UNITED STATES PATENT OFFICE.

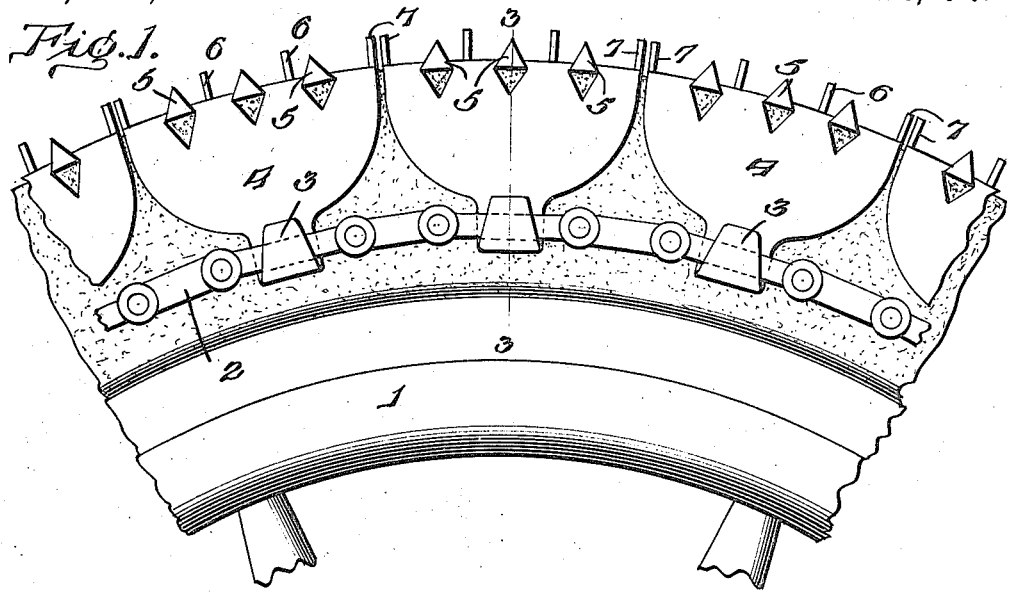
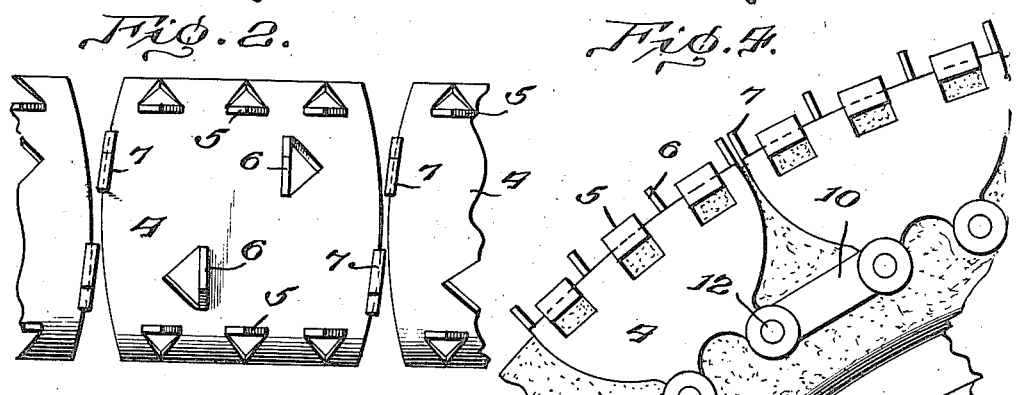
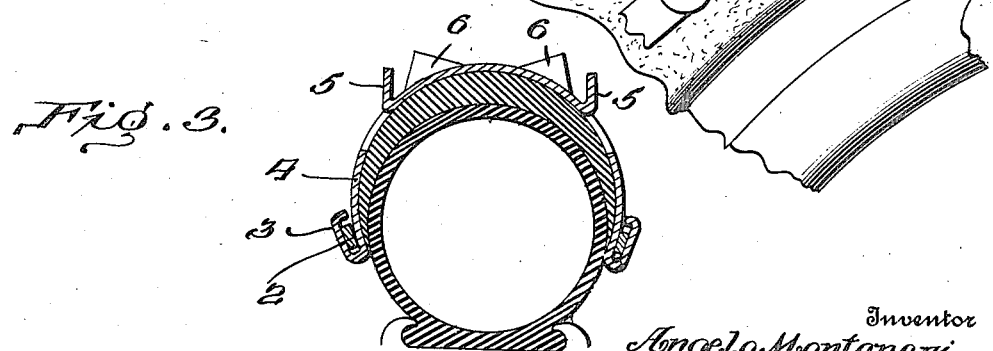

ANGELO MONTANARI, OF PENSACOLA, FLORIDA.

ANTISKIDDING ATTACHMENT.

1,215,179. Specification of Letters Patent. Patented Feb. 6, 1917.

Application filed June 4, 1915. Serial No. 32,128.

*To all whom it may concern:*

Be it known that I, ANGELO MONTANARI, of Pensacola, in the county of Escambia and State of Florida, have invented certain new and useful Improvements in Antiskidding Attachments; and I do hereby declare the following to be a full, clear, and exact description of the invention, such as will enable others skilled in the art to which it appertains to make and use the same.

The object of my invention is to provide an improved simple and efficient anti-skidding attachment for wheels of automobiles which may readily and quickly be positioned on a wheel and is capable of easy detachment therefrom.

In the accompanying drawings Figure 1 shows a segment of a wheel equipped with my improvement. Fig. 2 is a partial plan view. Fig. 3 is a cross section on line 3—3, Fig. 1. Fig. 4 shows a modified form of plate and attaching means.

Referring to the drawings, 1 designates an automobile wheel provided with a resilient tire, only a portion of the wheel and tire being shown. Arranged circumferentially of the tire on each side thereof are chains 2 which are designed to engage hooked ends 3 of anti-skidding plates 4. The latter are curved to conform to the tread of the tire and each is provided with a series of gripping members or cleats 5 struck therefrom on lines paralleling the length of the plate and a second series of grippers or cleats 6, the latter being struck from the plate on lines paralleling its ends. The cleats 6 are preferably arranged in staggered relation. In addition to the grippers heretofore mentioned I provide additional cleats 7 at each end of the plate and in parallelism with the cleats 6. These cleats are formed by outwardly bent extensions of plate 4 arranged on opposite sides of the longitudinal center line of the plate, thus preventing the end cleats of adjoining plates being in line with each other and forming a pocket for dirt, snow or ice. The gripping members may be of any preferred form either pointed, as shown in Figs. 1, 2, and 3, or with dulled contacting surfaces, as shown in Fig. 4.

In Fig. 4 I have shown a modified form of attaching means. Each of the plates 4 is connected with its next adjacent plate by means of links 10 secured by rivets 12 to said plates. In this form the plates practically form every alternate link of the chain.

The advantages of my invention will be apparent. It will be appreciated that an anti-skidding attachment of the type described may be quickly and easily applied to a wheel and that by means thereof traction may be secured on slippery roads with all likelihood of slipping or skidding avoided. By arranging the cleats or grippers in two series, one paralleling the sides and the other the ends of the plate, skidding is prevented side-wise, and forwardly when the brakes are applied. The angular disposition of the series of cleats relatively to each other insures a resistance to skidding in every direction. The series of grippers paralleling the ends of the plate perform the function of tractors as well as serving to prevent skidding.

I claim as my invention:

An anti-skidding attachment for tires comprising a plurality of curved plates, and chains for engaging said plates at each side for holding them in position on the wheel, each of said plates having two series of cleats struck therefrom, one series being at the outer edges of the tread surfaces of said plates and parallel therewith, and the other series being intermediate said former series and disposed transversely of said plates and in staggered relation, and a cleat struck up from each end of said plates on opposite sides of the longitudinal center line thereof.

In testimony whereof, I have signed this specification in the presence of two subscribing witnesses.

ANGELO MONTANARI.

Witnesses:
K. B. RADCLIFFE,
W. A. BLOUNT.